Oct. 17, 1939.  W. HARDY  2,176,554
PERISCOPE
Filed May 27, 1937

Inventor.
Wilbur Hardy
By Gould & Gould
Attorney

Patented Oct. 17, 1939

2,176,554

UNITED STATES PATENT OFFICE 2,176,554

PERISCOPE

Wilbur Hardy, Bremerton, Wash.

Application May 27, 1937, Serial No. 145,147

1 Claim. (Cl. 88—72)

This invention is directed to an improvement in periscopes designed to bring within the view of the observer a complete panoramic view without the necessity of turning or otherwise adjusting the periscope to increase its field of vision.

The primary object of the present invention is the provision of a periscope whose lateral field of vision is complete, including an area of 360 degrees, and whose vertical field of vision merges into the lateral field of vision to complete a vertical field of vision of approximately 180 degrees.

A further object of the invention is the projection of all included rays of light onto a flat reflector surface serving as the observation table for the user, such table being adjustable for convenient observation.

The invention is illustrated in the accompanying drawing, in which.

Figure 1:
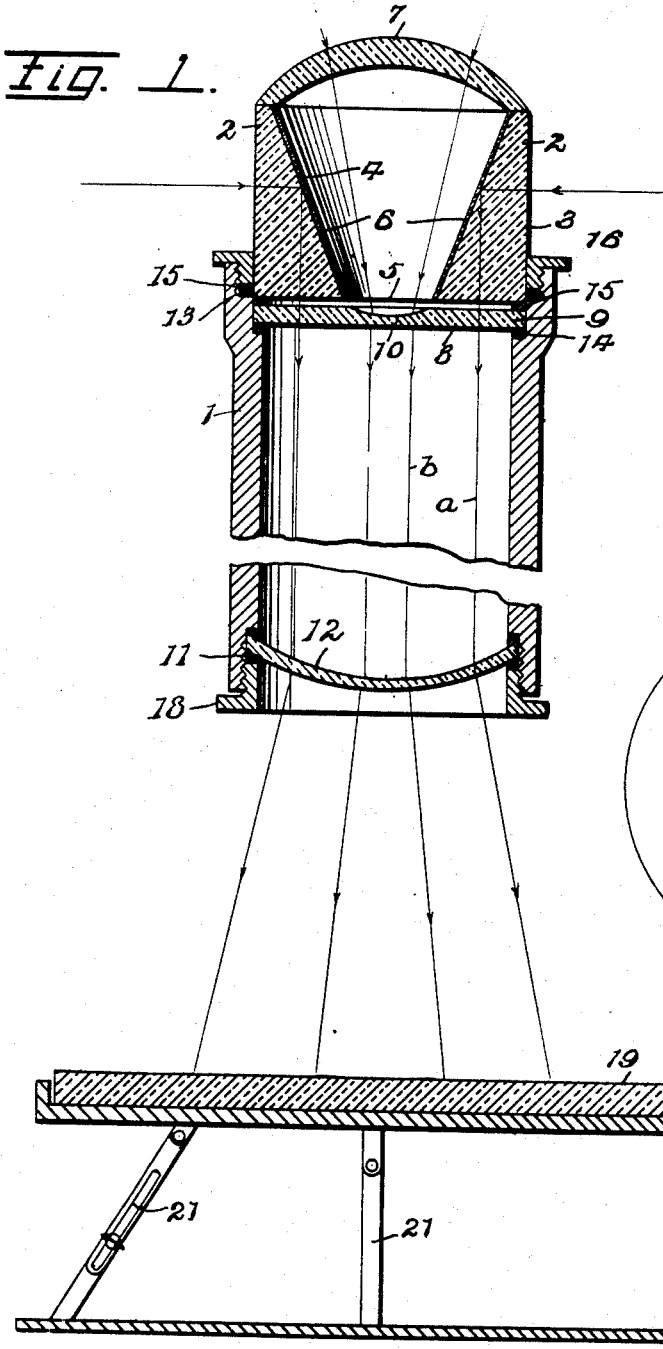
Figure 1 is a vertical sectional view through the essential parts of the periscope as constructed in accordance with the present invention.
Figure 2:
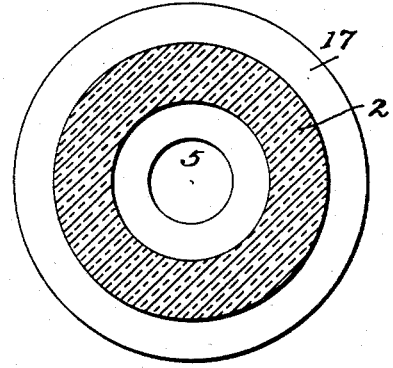
Figure 2 is a transverse section of the same on the line 2—2 of Figure 1.

The improved periscope includes a tubular member 1 which may be of any appropriate length or diameter, and is constructed to prevent light passage. Supported in and extending above the tube 1 is an annular prism 2, the outer wall 3 of which is parallel to the axis of the tube and the inner wall 4 of which is downwardly convergent, terminating at the lower end in an opening 5 of appreciable diameter. The complete inner surface 4 of the prism is silvered or otherwise provided with a reflective medium 6.

Mounted upon the upper end of the prism 2 is a converging concavo-convex lens 7, the peripheral edge of which is formed practically as a unit with the extreme upper end of the prism 2 to thereby avoid any interruption of light penetration at the margin of the lens 7 and the outer wall of the prism.

Immediately below the prism is arranged an optical glass plate 8 fitting within a recess 9 in the upper end of the tube 1. This plate 8 has an annular margin coextensive with the lower end of the prism 2 beyond the opening 5, and in line with said opening 5 the plate 8 is formed at 10 to provide a plano-concave lens.

The lower end of the tube 1 is formed with a recess 11 to receive a diverging concavo-convex lens 12, the diameter of which is at least coextensive with the diameter of the prism.

The prism 2 and plate 8 are supported in the recess 9 by a metallic frame 13 having inwardly extending ribs 14 and 15 to underlie and appropriately support the plate and prism, maintaining the prism the required distance from the upper surface of the plate. The upper edge of the frame overlies the upper edge of the tube 1, as at 16, and an annular cap 17 is threaded onto the tube to bear upon the portion 16 of the frame to maintain all parts in fixed relation.

The diverging concavo-convex lens 12 is held in the recess 11 by a U-shaped metallic frame 18 threaded onto the lower end of the tube 1, the inner portion of the frame underlying the lens 12. As thus constructed, there is provision for ready and convenient removal of the parts when necessary for repair or replacement.

Underlying the lens 12 is a table 19 of optical glass supported in a frame 20 having adjustable legs 21 by which the frame may be tilted.

It will be apparent from the above that objects beyond and in the range of the prism 2 throughout a full 360 degrees will have their light rays reflected from the surface 4 downwardly through the diverging lens 12 and onto the reflector table 19, such rays being indicated at $a$. Light rays transmitted through the converging concavo-convex lens 7 will be directed through the plano-convex lens portion 10 of the plate 8, then directed straight downwardly through the diverging lens 12 and onto the reflector table, such rays being indicated at $b$.

Thus, when the periscope is in position for observation, there is a panoramic view projected on the reflector table which includes full lateral vision and a substantial area of vertical vision. Furthermore, it will be noted that a moving object, such for example as an aeroplane, which is initially visible through the prism 2 will, when passing upwardly beyond the range of the prism, be immediately picked up and rendered visible on the observation table through the lens 7.

The details of construction involving the mounting of the periscope for projection into an observation position or withdrawal from that position are not shown, as they form no part of the present invention and any and all such constructions as may be appropriate are contemplated for use. It is to be particularly noted, however, that the improved periscope, when projected into observation position, requires no turning or other adjustment to enlarge, increase, or change its field of vision, as the full panoramic view becomes visible on the observation table wholly regardless of the position or positions of the object or objects being observed so long as they are above the lowest effective margin of the prism 2.

What is claimed to be new is:

A periscope including a light-proof tube open at the respective ends and formed adjacent each end with a supporting shoulder, a non-refractive transparent plate having a plane parallel annular margin and a plano-concave central portion for light passage being mounted on the shoulder at one end, an annular prism being arranged within the tube in axial alignment with the plate and secured with its lower end adjacent and in spaced relation to the upper surface of the plate, the annular portion of the lower end of said prism being co-extensive with the annular margin of the plate, the annular prism having an upwardly divergent inner margin terminating at its lower end in an opening in line with the plano-concave portion of the plate, the inner margin of the prism being provided with a reflective medium, the area of the plate immediately below the opening at the lower end of the prism being formed as a plano-concave lens, a converging concavo-convex lens bridging the upper edge of the prism, and a diverging lens held against the shoulder at the lower end of the tube, whereby light rays through the upper converging concavo-convex lens are directed into parallel rays by the plano-concave lens of the plate with the light rays directed through the prism from the exterior being reflected by the reflecting medium and directed as uninterrupted rays through the plate beyond the plano-concave lens portion, whereby the received rays are projected beyond the plate in parallelism and diverged by the concavo-convex lens at the lower end of the tube.

WILBUR HARDY.